(12) United States Patent
Igarashi

(10) Patent No.: US 9,924,203 B2
(45) Date of Patent: Mar. 20, 2018

(54) DELIVERY DEVICE AND DELIVERY METHOD

(71) Applicant: YAHOO JAPAN CORPORATION, Tokyo (JP)

(72) Inventor: Sotaro Igarashi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 0 days.

(21) Appl. No.: 14/484,462

(22) Filed: Sep. 12, 2014

(65) Prior Publication Data

US 2015/0271532 A1 Sep. 24, 2015

(30) Foreign Application Priority Data

Mar. 20, 2014 (JP) ................................ 2014-057798

(51) Int. Cl.
| | |
|---|---|
| *H04N 21/234* | (2011.01) |
| *H04N 21/25* | (2011.01) |
| *H04N 21/2543* | (2011.01) |
| *H04N 21/258* | (2011.01) |
| *H04N 21/433* | (2011.01) |
| *H04N 21/214* | (2011.01) |
| *H04N 21/81* | (2011.01) |
| *H04N 21/254* | (2011.01) |
| *H04N 21/442* | (2011.01) |

(52) U.S. Cl.
CPC ..... *H04N 21/2146* (2013.01); *H04N 21/2542* (2013.01); *H04N 21/25883* (2013.01); *H04N 21/44218* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 6,938,258 B1* | 8/2005 | Weinberger | H04L 67/12 719/312 |
| 2008/0215415 A1* | 9/2008 | Willms | G06Q 10/06316 705/14.43 |
| 2009/0052859 A1* | 2/2009 | Greenberger | H04N 9/87 386/213 |

(Continued)

FOREIGN PATENT DOCUMENTS

| | | |
|---|---|---|
| JP | A-2002-026837 | 1/2002 |
| JP | 2002-236820 A | 8/2002 |

(Continued)

OTHER PUBLICATIONS

Mar. 1, 2016 Office Action issued in Japanese Patent Application No. 2014-057798.

*Primary Examiner* — Brian T Pendleton
*Assistant Examiner* — Jean D Saint Cyr
(74) *Attorney, Agent, or Firm* — Oliff PLC

(57) ABSTRACT

A delivery device according to the present disclosure includes a receiving unit and a delivering unit. The receiving unit receives a user attribute of a user using a space in which an output device is installed for each user. The delivering unit delivers content corresponding to the user to the output device for each user based on the user attribute received through the receiving unit. Thus, the delivery device the present disclosure can effectively use an output device installed for each user.

13 Claims, 8 Drawing Sheets

(56) References Cited

U.S. PATENT DOCUMENTS

| | | | | |
|---|---|---|---|---|
| 2011/0219407 A1* | 9/2011 | Margis | ................... | H04N 7/163 |
| | | | | 725/75 |
| 2013/0254035 A1* | 9/2013 | Ramer | ............... | G06Q 30/0256 |
| | | | | 705/14.62 |
| 2014/0143046 A1* | 5/2014 | Doe | ................... | G06Q 30/0277 |
| | | | | 705/14.48 |
| 2014/0204033 A1* | 7/2014 | Lauber | ................... | B60K 37/00 |
| | | | | 345/173 |
| 2015/0026720 A1* | 1/2015 | Rakshit | ............. | G06Q 30/0251 |
| | | | | 725/35 |
| 2015/0163560 A1* | 6/2015 | Holley | ............... | H04N 21/6143 |
| | | | | 725/1 |
| 2015/0181286 A1* | 6/2015 | Gonzalez | ........... | H04N 21/6143 |
| | | | | 725/28 |

FOREIGN PATENT DOCUMENTS

| | | |
|---|---|---|
| JP | 2003-150681 A | 5/2003 |
| JP | 2004-220498 A | 8/2004 |
| JP | A-2005-092732 | 4/2005 |
| JP | 2007-172605 A | 7/2007 |
| JP | 2007-199589 A | 8/2007 |
| JP | 2012-084939 A | 4/2012 |
| JP | 2012-198591 A | 10/2012 |

* cited by examiner

| ADVER-TISEMENT FRAME ID | FLIGHT ID | DEPARTURE TIME | OPERA-TION HOURS | NUMBER OF SEATS | DEPAR-TURE PLACE | DESTINATION | UNIT DELIVERY PRICE |
|---|---|---|---|---|---|---|---|
| C001 | F01 | 2014/4/1/10:00 | 1:00 | 300 | TOKYO | OSAKA | 100 |
| C002 | F02 | 2014/4/1/10:00 | 1:30 | 180 | TOKYO | FUKUOKA | 120 |
| C003 | F03 | 2014/4/1/13:00 | 13:00 | 400 | TOKYO | NEW YORK | 200 |
| ... | ... | ... | ... | ... | ... | ... | ... |

| FLIGHT ID | SEAT ID | USER ID | SEX | AGE | SIMULTANEOUS PURCHASE USER ID |
|---|---|---|---|---|---|
| F01 | S111 | U111 | MALE | 40 | U112, U113 |
| | S112 | U112 | FEMALE | 35 | U111, U113 |
| | S113 | U113 | MALE | 5 | U111, U112 |
| | S114 | U114 | MALE | 60 | - |
| | ... | ... | ... | ... | ... |
| F02 | S211 | U211 | MALE | 30 | U212 |
| | S212 | U212 | FEMALE | 30 | U211 |
| | ... | ... | ... | ... | ... |
| ... | ... | ... | ... | ... | ... |

| ADVER-TISER ID | ADVER-TISEMENT CONTENT ID | DELIVERY PERIOD OF TIME | TARGET SEX | TARGET AGE | GENRE | TARGET DESTINA-TION | BUDGET |
|---|---|---|---|---|---|---|---|
| CL01 | AD01 | 2014/3/20 TO 2014/4/10 | FEMALE | 25 YEARS AND OLDER | COSMET-ICS | OSAKA | 100000 |
| CL02 | AD02 | 2014/3/25 TO 2014/4/5 | MALE | 40 YEARS AND OLDER | VEHICLES | IN JAPAN | 50000 |
| CL03 | AD03 | 2014/3/30 TO 2014/4/3 | MALE AND FEMALE | ALL AGES | FOODS | FUKUOKA | 30000 |
| ... | ... | ... | ... | ... | ... | ... | ... |

| ADVERTISEMENT CONTENT ID | ADVERTISEMENT FRAME ID | NUMBER OF TARGET PASSENGERS |
|---|---|---|
| AD01 | C001 | 80 |
| AD02 | C002 | 120 |
| AD03 | C003 | 180 |
| ... | ... | ... |

DELIVERY DEVICE AND DELIVERY METHOD

CROSS-REFERENCE TO RELATED APPLICATIONS

The present application claims priority to and incorporates by reference the entire contents of Japanese Patent Application No. 2014-057798 filed in Japan on Mar. 20, 2014.

BACKGROUND OF THE INVENTION

1. Field of the Invention

The present invention relates to a delivery device, a delivery method, and a delivery program.

2. Description of the Related Art

Currently, there are cases in which an output device for a user is installed for each user in a space where people gather. For example, a passenger can use a terminal for each passenger equipped in a seat in an aircraft.

As a technique related to such a terminal equipped in a seat in an aircraft, known is a technique of installing a server in an aircraft, preparing content or products for passengers, and thus increasing a client satisfaction level of passengers. Further, known is a technique related to an information delivery system in which an information delivery management center edits content for a passenger, and content is delivered so that a passenger in a moving object such as an aircraft or a vessel can enjoy, for example, content information such as a moving image or music information enjoyable on land with an appropriate real-time property at the same quality as on land.

However, in the related art, it is difficult to effectively use an output device installed for each user. Specifically, in the related art, a passenger serving as the user of the output device receives no more than delivery of content desired by himself or herself. In such a content delivery service, it is unclear whether or not a passenger can select content desired to be viewed truly by himself or herself, and thus usability is low. Further, a passenger may lose an opportunity to get useful information from an output device. As described above, in the related art, it is difficult to effectively use an output device despite the fact that an output device is installed for each passenger.

The present disclose was made in light of the foregoing, and it is an object of the present disclose to provide a delivery device, a delivery method, and a delivery program, which are capable of effectively using an output device installed for each user.

SUMMARY OF THE INVENTION

According to the exemplary embodiment, a delivery device includes a receiving unit configured to receive a user attribute of a user using a space in which an output device is installed for each user and a delivering unit configured to deliver content corresponding to the user to the output device for each user based on the user attribute received through the receiving unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an exemplary advertisement frame table according to an embodiment;

FIG. 4 is a diagram illustrating an exemplary boarding information table according to an embodiment;

FIG. 5 is a diagram illustrating an exemplary advertisement content storage unit according to an embodiment;

FIG. 6 is a diagram illustrating en exemplary delivery storage unit according to an embodiment;

DETAILED DESCRIPTION OF THE PREFERRED EMBODIMENTS

Figure 1:
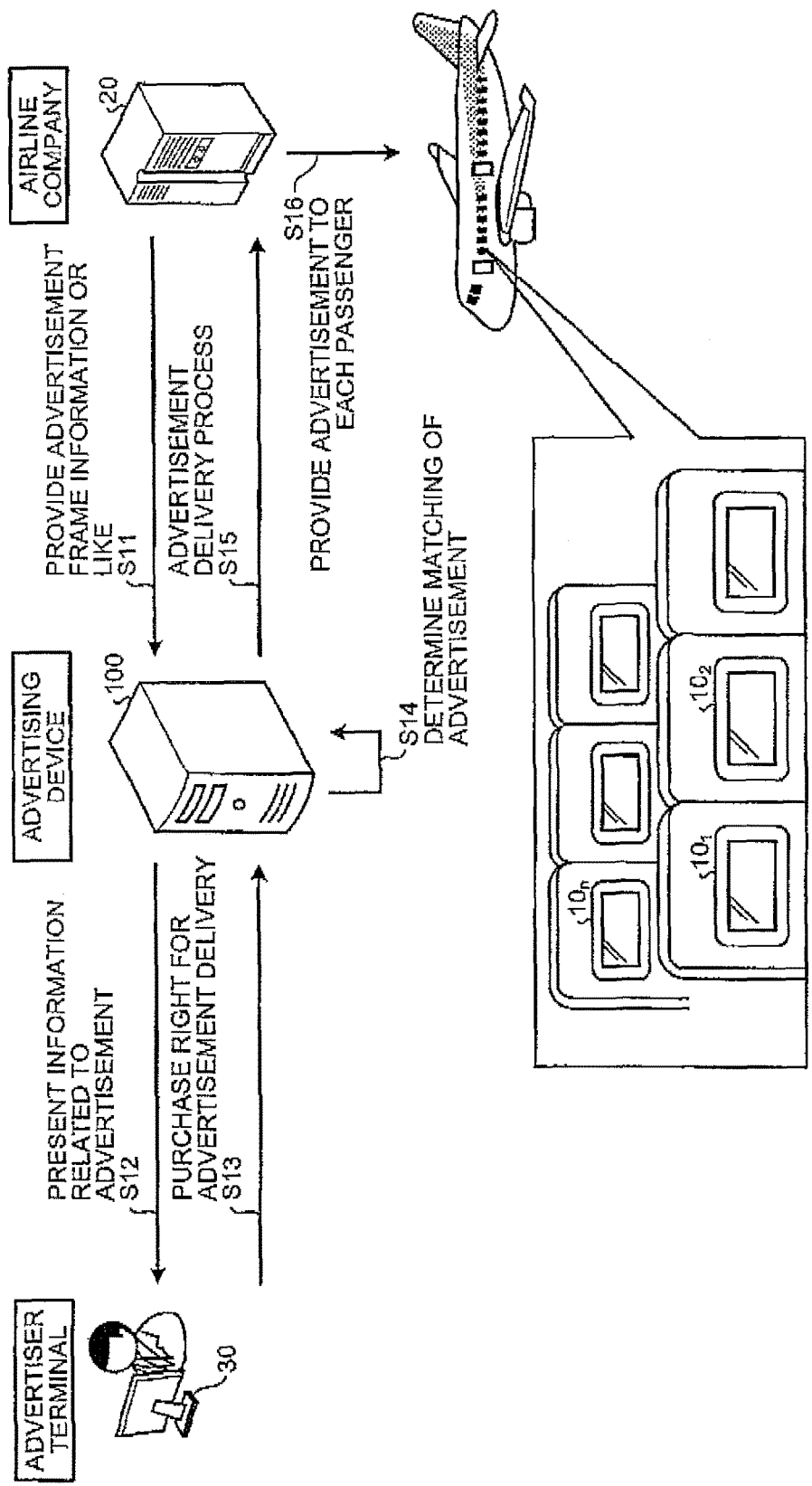
FIG. 1 is a diagram illustrating an overview of a delivery process according to an embodiment.

Hereinafter, modes (hereinafter, referred to as "embodiments") for carrying out a delivery device, a delivery method, and a delivery program according to the present disclosure will be described in detail with reference to the appended drawings. The delivery device, the delivery method, and the delivery program according to the present disclosure are not limited to the following embodiments. Further, in the following embodiments, the same components are denoted by the same reference numerals, and a repeated description is omitted.

1. Overview of Delivery Process

First, an overview of a delivery process according to an embodiment will be described with reference to FIG. 1. FIG. 1 is a diagram illustrating an overview of a delivery process according to an embodiment. FIG. 1 illustrates an overview of a delivery process according to an embodiment in connection with an example of a delivery system 1 including an advertising terminal 100 corresponding to a delivery device according to the present disclosure. The following description will proceed with an example in which an output device of each user is installed in a space in an aircraft.

The delivery system 1 includes a plurality of seat terminals $10_1$, $10_2$, . . . , and $10_n$ (n is an arbitrary number), an airline company device 20, an advertiser terminal 30, and an advertising terminal 100 as illustrated in FIG. 1. The advertising terminal 100 is connected to be able to communicate with the airline company device 20 and the advertiser terminal 30 via a network (not illustrated). The number of seat terminals $10_1$, $10_2$, . . . , and $10_n$, the number of airline company devices 20, and the number of advertiser terminals 30 included in the delivery system 1 are not limited to the example illustrated in FIG. 1.

The seat terminals $10_1$, $10_2$, . . . , and $10_n$ are output devices that are equipped in passenger seats to output content such as a moving image in an aircraft. The seat terminals $10_1$, $10_2$, . . . , and $10_n$ are, for example, liquid crystal monitors. In the following, when it is unnecessary to distinguish the seat terminals $10_1, 10_2, \ldots,$ and $10_n$ from one another, they are also expressed collectively as a "seat terminal 10." Further, for example, the seat terminal 10 is assumed to have an input function as in a touch panel or to be able to receive an input from a passenger, for example, using an input device (for example, an operation panel installed near the seat terminal 10) operating in conjunction with the seat terminal 10. The seat terminal 10 is commonly installed on a back side of a seat in front of a seat on which the user sits, but an installation form thereof is not limited to this example. For example, the seat terminal 10 used by the user sitting in the front of an aircraft may be installed on a wall surface in an aircraft instead of a seat. For example, the seat terminal 10 may be installed so that the seat terminal 10 is accommodated in an armrest of a seat on which the user sits, and the user takes the seat terminal 10 out on hand and uses the seat terminal 10. In other words, the seat terminal 10 can be installed in any form or place as long as the seat terminal 10 is an output device that can be used by each passenger in an aircraft. Further, "used for each passenger" means not only that a single person need not necessarily use a one seat terminal 10 but also that several people may use a single seat terminal 10.

The airline company device 20 is a server device managed by an airline company. Specifically, as will be described later, the airline company device 20 provides information related to an advertisement frame to the advertising terminal 100, and delivers advertisement content to the seat terminal 10.

The advertiser terminal 30 is an information processing device used by an advertiser who requests the advertising terminal 100 to delivery an advertisement. Examples of the advertiser terminal 30 include a desk top person computer (PC), a lap top PC, a tablet terminal, a mobile terminal, and a personal digital assistant (PDA). According to an operation performed by an advertiser, the advertiser terminal 30 receives information related to advertisement delivery provided from the advertising terminal 100 or requests the advertising terminal 100 to deliver en advertisement.

Further, an advertiser may request the advertising terminal 100 to present user information (for example, information related to passengers of an aircraft) using the advertiser terminal 30 or may transmit an advertisement delivery request to an agency without making such a request. In this case, the agency transmits such a request to the advertising terminal 100. Hereinafter, an expression of "advertiser" is assumed to be a concept including an agency as well as an advertiser, and an expression of "advertiser terminal" is assumed to be a concept including an agency device used by an agency as well as an advertiser terminal.

The advertising terminal 100 is a server device that performs an advertisement delivery process. Specifically, as will be described later, the advertising terminal 100 performs a process of delivering advertisement content submitted from the advertiser terminal 30 to the seat terminal 10.

In the example illustrated in FIG. 1, the advertising terminal 100 receives information related to a frame (which is hereinafter also referred to as an "advertisement frame") capable of providing an advertisement using the seat terminal 10 in an aircraft and boarding information from the airline company device 20 (step S11).

Here, information related to an advertisement frame includes identification information of an aircraft to which advertisement content is actually delivered, the number of seats of an aircraft, a departure place of an aircraft, a destination of an aircraft, a unit delivery price (an amount of money billed to an advertiser when advertisement content is delivered to a one passenger) when advertisement content is delivered through an advertisement frame, and the like.

Further, boarding information indicates information in which a passenger and a seat in an aircraft are associated. In other words, the advertising terminal 100 can specify the seat terminal 10 used by the passenger for each passenger with reference to the boarding information. Further, the boarding information includes information related to a passenger's attribute (for example, a sex or an age of a passenger) acquired by the airline company device 20, for example, when an aircraft ticket purchase procedure is performed.

Then, the advertising terminal 100 presents information related to advertisement delivery to an aircraft to the advertiser terminal 30 (step S12). Further, the advertising terminal 100 receives information indicating that an advertisement is desired to be delivered in the advertisement frame from the advertiser terminal 30. In other words, the advertising terminal 100 provides a selling service of selling a right capable of delivering an advertisement in an advertisement frame to the advertiser terminal 30. Further, the information related to the advertisement delivery includes the information related to the advertisement frame and the boarding information with which the advertising terminal 100 is provided from the airline company device 20. Further, "delivering an advertisement in an advertisement frame" indicates that advertisement content being played from several tens of seconds to several minutes is delivered to the seat terminal 10 once or more at a certain timing while an aircraft is being operated.

Then, the advertiser terminal 30 transmits information indicating an intention to purchase a right capable of delivering an advertisement in an advertisement frame to the advertising terminal 100 based on the information presented from the advertising terminal 100 (step S13). Specifically, the advertiser terminal 30 designates a condition related to advertisement delivery such as a date and time at which an advertisement is delivered, a passenger's attribute, and a destination of an aircraft, and transmits information indicating that an advertisement is desired to be delivered using a certain advertisement frame to the advertising terminal 100.

Then, the advertising terminal 100 determines matching between the condition related to the advertisement delivery designated by the advertiser terminal 30 and the information related to the advertisement frame received from the airline company device 20 (step S14). Here, "matching" indicates that the condition related to the advertisement delivery designated by the advertiser terminal 30 matches the information related to the advertisement frame received from the airline company device 20. In other words, the advertising terminal 100 determines whether or not delivery of advertisement content desired by the advertiser terminal 30 in a certain advertisement frame received from the airline company device 20 satisfies a designated condition. Further, as will be described in detail later, the advertising terminal 100 may notify the advertiser terminal 30 of the determination result on the matching and confirm acceptance of advertisement delivery.

Then, the advertising terminal 100 delivers advertisement content to the airline company device 20 in order to provide advertisement content through the advertisement frame determined to satisfy the condition designated by the advertiser terminal 30 (step S15). In other words, the advertising terminal 100 provides information related to advertisement content by delivering advertisement content corresponding to each passenger to the seat terminal 10 used by each passenger through the airline company device 20 (step S16).

Specifically, the advertising terminal 100 delivers advertisement content corresponding to an adult male to the seat terminal 10$_1$ used by an adult male. Further, the advertising terminal 100 delivers advertisement content corresponding to an adult female to the seat terminal 10$_2$ used by an adult female.

As described above, the advertising terminal 100 according to an embodiment receives attributes of passengers using an aircraft in which the seat terminal 10 is installed for each passenger, and delivers advertisement content corresponding to the passengers to the seat terminal 10 for each passenger based on the received attributes of the passengers. Thus, the advertising terminal 100 according to an embodiment delivers advertisement content suitable for each passenger and thus can implement advertisement delivery leading to high advertising effects targeted on an advertising target. Further, the advertising terminal 100 according to an embodiment extracts an advertisement delivery target based on the hoarding information provided by the airline company device 20, and thus can perform targeting based on an accurate passenger attribute. Further, the advertising terminal 100 according to an embodiment receives a condition related to advertisement delivery from the advertiser terminal 30, and determines advertisement content to be delivered based on the received condition. Thus, the advertising terminal 100 according to an embodiment can deliver advertisement content corresponding to a destination of an aircraft or the like and provide information useful in a destination to a passenger. As described above, the advertising terminal 100 can effectively use the seat terminal 10 equipped in an aircraft.

Further, when the advertising terminal 100 according to an embodiment is used, the advertiser can designates a desired condition and causes advertisement content to be delivered through the seat terminal 10 in an aircraft. Thus, the advertiser need not perform a complicated task of appropriately acquiring bidding information related to an advertisement in an aircraft or submitting advertisement content to each airline company for each aircraft in connection with advertisement delivery in an aircraft. In other words, the advertising terminal 100 according to an embodiment can manage an advertisement frame in an aircraft in an integrated fashion regardless of an aircraft and an airline company. Thus, the advertising terminal 100 according to an embodiment simplifies an advertiser's task related to advertisement delivery and thus reduces an advertiser's burden. Further, the advertising terminal 100 according to an embodiment can deliver advertisement content to the seat terminal 10 equipped for each passenger and thus cause a passenger to view advertisement content more reliably than in display advertising on a street. Thus, when the advertising terminal 100 according to an embodiment is used, the advertiser can implement advertisement delivery leading to high advertising effects.

2. Configuration of Advertising Terminal

Figure 2:
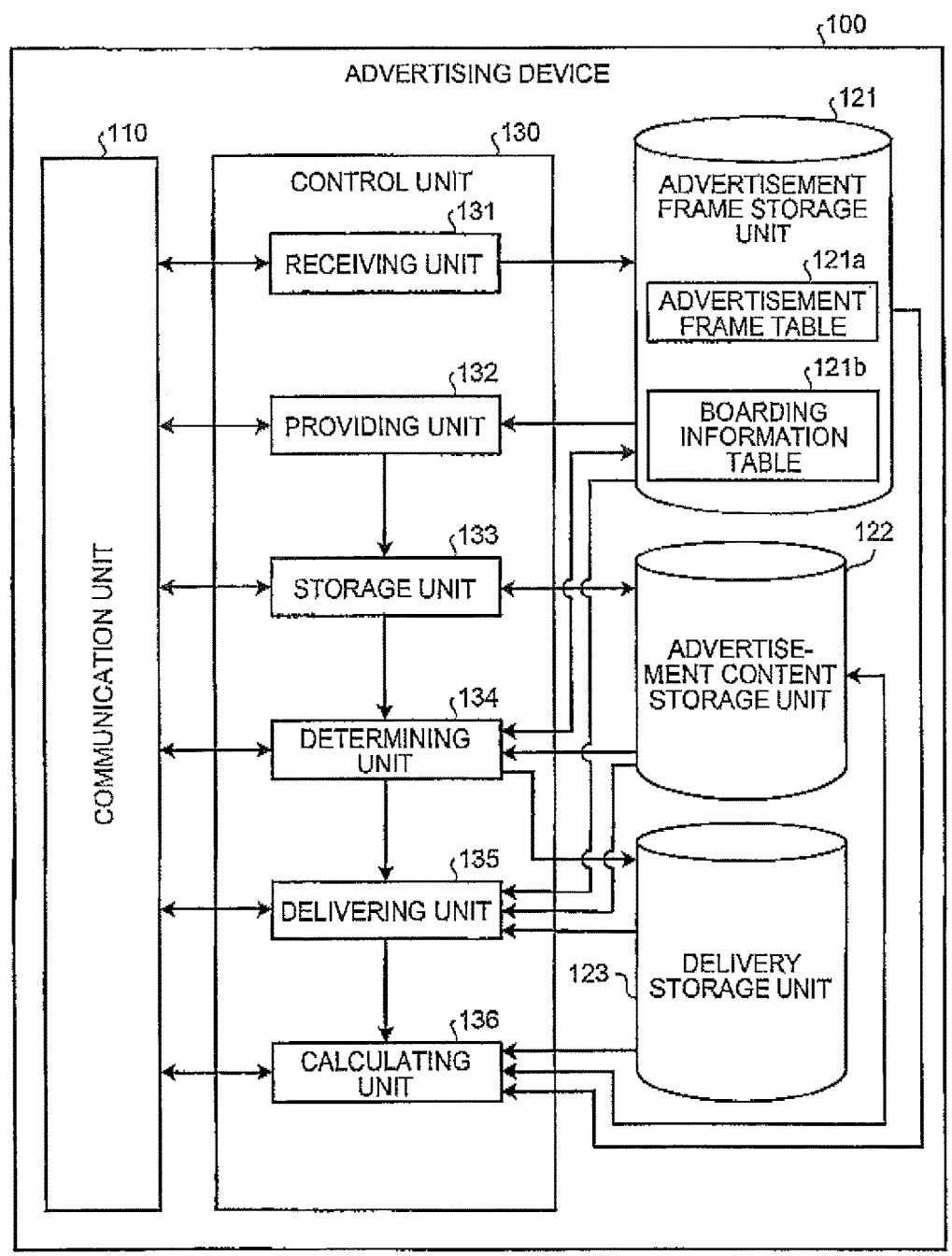
FIG. 2 is a diagram illustrating an exemplary configuration of an advertising terminal according to an embodiment.

Next, a configuration of the advertising terminal 100 according to an embodiment will be described with reference to FIG. 2. FIG. 2 is a diagram illustrating an exemplary configuration of the advertising terminal 100 according to an embodiment. The advertising terminal 100 includes a communication unit 110, an advertisement frame storage unit 121, an advertisement content storage unit 122, a delivery storage unit 123, and a control unit 130 as illustrated in FIG. 2. The advertising terminal 100 may further include input unit (for example, a keyboard, a mouse, or the like) receiving various kinds of operations from an administrator or the like using the advertising terminal 100 or a display unit (for example, a liquid crystal display (LCD) or the like) displaying various kinds of information.

2-1. Communication Unit

The communication unit 110 is implemented by, for example, a network interface card (NIC) or the like. The communication unit 110 is connected with a network (not illustrated) in a wired or wireless manner, and transmits or receives information to or from the airline company device 20 and the advertiser terminal 30 via the network.

2-2. Storage Unit

The advertisement frame storage unit 121, the advertisement content storage unit 122, and the delivery storage unit 123 are implemented by semiconductor memory devices such as random access memories (RAM) or flash memories or storage devices such as hard disks or optical disks.

2-3. Advertisement Frame Storage Unit

The advertisement frame storage unit 121 stores information related to an advertisement frame and boarding information. Specifically, the advertisement frame storage unit 121 according to an embodiment stores information related to an advertisement frame received from the airline company device 20 through a receiving unit 131 which will be described later and boarding information of an aircraft corresponding to the advertisement frame in association with each other.

The advertisement frame storage unit 121 includes an advertisement frame table 121*a* and a boarding information table 121*b* as illustrated in FIG. 2. The tables will be described below.

2-3(1). Advertisement Frame Table

The advertisement frame table 121*a* is a table storing information related to an advertisement frame. Here, FIG. 3 illustrates an example of the advertisement frame table 121*a* according to an embodiment. FIG. 3 is a diagram illustrating an example of the advertisement frame table 121*a* according to an embodiment. In the example illustrated in FIG. 3, the advertisement frame table 121*a* includes items such as an "advertisement frame ID," a "flight ID," a "departure time," an "Operation hours," the "number of seats," a "departure place," a "destination," and a "unit delivery price."

"Advertisement frame ID" indicates identification information identifying an advertisement frame serving as a frame in which advertisement content is provided. For example, the advertiser may receive a notification indicating that advertisement content is delivered in an advertisement frame identified by an advertisement frame ID "C001" from the advertising terminal 100. In the following, identification information stored in the advertisement frame ID illustrated in FIG. 3 is also used as a reference number of an advertisement frame. For example, an advertisement frame identified by an advertisement frame ID "C001" is also denoted as an "advertisement frame C001."

The "flight ID" indicates identification information identifying a flight related to an operation of an aircraft. In the example illustrated in FIG. 3, the advertisement frame ID and the flight ID are stored in association with each other. In other words, delivery of advertisement content using the advertisement frame C001 indicates that advertisement content is delivered in an aircraft corresponding to a flight ID "F01."

The "departure time" indicates a time at a flight related to an advertisement frame departs. Further, "operation hours" indicates hours required for an operation of a flight. In other words, an advertiser can check hours during which advertisement content is delivered using an advertisement frame with reference to the departure time and the operation hours.

The "number of seats" indicates the number of seats equipped in an aircraft corresponding to a flight related to an advertisement frame. In other words, an advertiser can check the number of people to which advertisement content can be provided using a certain advertisement frame with reference to the number of seats.

The "departure place" indicates a departure place of a flight related to an advertisement frame. Further, the "destination" indicates a destination of a flight related to an advertisement frame.

The "unit delivery price" indicates a unit price for each passenger when advertisement content is delivered using an advertisement frame. In other words, an amount of money calculated by multiplying the number of passengers by the unit delivery price when advertisement content is delivered to the passengers in a certain advertisement frame is billed to an advertiser.

In other words, the example illustrated in FIG. 3 indicates that the advertisement frame C001 is set to a flight identified by a flight ID "F01." Further, it indicates that for the flight identified by the flight ID "F01" corresponding to the advertisement frame C001, the departure time is "10 o'clock 00 minute 00 second, Apr. 1, 2014," the operation hours is "one hour," the number of seats is "300," the departure place is "Tokyo," and the destination is "Osaka." Further, it indicates that the unit delivery price set to the advertisement frame C001 is "100 yen."

2-3(2). Boarding Information Table

The boarding information table 121b is a table storing information related to boarding information. Here, FIG. 4 illustrates an example of the boarding information table 121b according to an embodiment. FIG. 4 is a diagram illustrating an example of the boarding information table 121b according to an embodiment. In the example illustrated in FIG. 4, the boarding information table 121b includes items such as a "flight ID," a "seat ID," a "user ID," a "sex," an "age," and a "simultaneous purchase user ID." The items described above will not be described.

The "seat ID" is identification information identifying a seat equipped in an aircraft. In other words, in an aircraft, a passenger is allocated to each seat ID. Further, since the seat terminal 10 is equipped for each seat, the advertising terminal 100 can identify a passenger using a certain seat terminal 10 with reference to the seat ID.

The "user ID" is identification information identifying a passenger boarding an aircraft. The user ID is issued for each passenger, for example, when a passenger performs a procedure to purchase a ticket on the airline company device 20.

The "sex" indicates sex of a passenger corresponding to the user ID. Further, the "age" indicates an age of a passenger corresponding to the user ID. Further, the "simultaneous purchase user ID" indicates a user ID corresponding to a ticket purchased through a ticket purchase procedure at the same time as a passenger corresponding to a user ID when the passenger performs a procedure to purchase a ticket. It means that passengers identified by user IDs stored in the simultaneous purchase user item are likely to be family members or have a relation belonging to the same group.

In other words, the example illustrated in FIG. 4 indicates that in the flight identified by the flight ID "F01," a user identified by a user ID "U111" sits on a seat identified by a seat ID "S111." Further, it indicates that for a passenger identified by the user ID. "U111" is "male" in sex and has an age of "40." Further, it indicates that the passenger identified by the user ID "U111" has purchased tickets for passengers identified by user IDs "U112" and "U113" when purchasing a ticket of a flight.

2-4. Advertisement Content Storage Unit

The advertisement content storage unit 122 stores information related to advertisement content submitted from the advertiser terminal 30. Specifically, the advertisement content storage unit 122 stores a condition related to advertisement delivery and advertisement content to be submitted from an advertiser that desires to deliver an advertisement in a selling service provided by a providing unit 132 which will be described later. Here, FIG. 5 illustrates an example of the advertisement content storage unit 122 according to an embodiment. FIG. 5 is a diagram illustrating an example of the advertisement content storage unit 122 according to an embodiment. In the example illustrated in FIG. 5, the advertisement content storage unit 122 includes items such as an "advertiser ID," an "advertisement content ID," a "delivery period of time," a "target sex," a "target age," a "genre," a "target destination," and a "budget."

The "advertiser ID" indicates identification information identifying an advertiser or the advertiser terminal 30. Specifically, the advertiser ID is identification information identifying each advertiser submitting advertisement content using a provision service for a right capable of delivering an advertisement which is provided by the advertising terminal 100.

The "advertisement content ID" indicates identification information identifying advertisement content submitted from an advertiser to the advertising terminal 100.

Further, data advertisement content to be actually delivered to the seat terminal 10 may be stored in an advertisement delivery server equipped separately from the advertising terminal 100. In this case, the advertising terminal 100 specifies advertisement content stored in an external advertisement delivery server based on the advertisement content ID stored in the advertisement content storage unit 122. Further, the advertising terminal 100 controls the advertisement delivery server such that specified advertisement content is delivered to an aircraft. In the following, there are cases in which identification information stored in an advertisement content ID illustrated in FIG. 5 is used as a reference numeral of advertisement content. For example, advertisement content identified by an advertisement content ID "AD01" is also denoted as an "advertisement content AD01."

The "delivery period of time" indicates a designation of a period of time in which advertisement content is delivered. The "target sex" indicates a designation of a sex of a passenger serving as a target to which an advertiser delivers advertisement content. Further, the "target age" indicates a designation of an age of a passenger serving as a target to which an advertiser delivers advertisement content. Further, the "genre" indicates a genre advertisement content submitted by an advertise. Further, the "target destination" indicates a designation of a destination of a flight related to an advertisement frame serving as a target to which an advertiser delivers advertisement content. The target destination may be a concrete place name, a country name, or the like. An advertiser need not necessarily perform the designation on all items. For example, an advertiser may set "all ages" as a target without specifically designating a target age.

The "budget" indicates a budget as an advertising rate for delivery of advertisement content. FIG. 5 illustrates an example in which an advertiser sets a budget for each advertisement content in advance. An amount of money calculated by multiplying the number of delivered passengers by the unit delivery price is billed to an advertiser each time advertisement content is delivered. Then, when a billed amount exceeds a budget, delivery of advertisement content is held.

In other words, the example of FIG. 5 indicates that an advertiser identified by an advertiser ID "CL01" has submitted advertisement, content identified by the advertisement content ID "AD01." Further, it indicates that for the advertisement content AD01, the delivery period of time is from "Mar. 20, 2014 through Apr. 10, 2014," the target sex is "female," the target age is "25 years and older," and the genre is "cosmetics." Further, it indicates that for the advertisement content AD01 is desired to be delivered in an advertisement frame in which the destination is "Osaka." Furthermore, it indicates that the budget set to the advertisement content AD01 is "100000 yen."

2-5. Delivery Storage Unit

The delivery storage unit 123 stores info information in which an advertisement frame is associated with advertisement content. Specifically, the delivery storage unit 123 according to an embodiment stores a result of determining matching between advertisement content and an advertisement frame through a determining unit 134 which will be described later and so allocating an appropriate advertisement frame to advertisement content. Here, FIG. 6 illustrates an example of the delivery storage unit 123 according to an embodiment. FIG. 6 is a diagram illustrating an example of the delivery storage unit 123 according to an embodiment. In the example illustrated in FIG. 6, the delivery storage unit 123 includes items such as an "advertisement content ID," an "advertisement frame ID," and the "number of target passengers." The items described above will not be described.

The "number of target passengers" indicates the number of passengers serving as a target to which advertisement content is delivered through an advertisement frame to which advertisement content is allocated. In other words, the number of target passengers indicates the number of passengers satisfying a condition such as a passenger's attribute set to advertisement content in an advertisement frame to which advertisement content is allocated. Although not illustrated in FIG. 6, information stored in the delivery storage unit 123 includes information identifying the seat terminal 10 that receives a delivered advertisement. For example, the information identifying the seat terminal 10 may be a user ID or a seat IC of a passenger satisfying a condition set to advertisement content. In the following, information in which an advertisement frame is associated with advertisement content is also denoted as "delivery information."

In other words, FIG. 6 indicates that the advertisement frame "C001" is allocated to the advertisement content "AD01." It indicates that the advertisement content "AD01." is delivered to the seat terminal 10 equipped in an aircraft corresponding to the advertisement frame "C001." Further, it indicates that the advertisement content "AD01" is delivered through the seat terminals 10 used by 80 passengers in the advertisement frame "C001."

2-6. Control Unit

For example, the control unit 130 is implemented by executing various kinds of programs (corresponding to an example of a delivery program) stored in a storage device in the advertising terminal 100 through a central processing unit (CPU), a micro processing unit (MPU), or the like using a read only memory (RAM) as a work area. Further, for example, the control unit 130 is implemented by an integrated circuit such as an application specific integrated circuit (ASIC) or a field programmable gate array (FPGA).

As illustrated in FIG. 2, the control unit 130 includes the receiving unit 131, the providing unit 132, a storage unit 133, the determining unit 134, a delivering unit 135, and a calculating unit 136, and implements or executes an information processing function described below. An internal configuration of the control unit 130 is not limited to the configuration illustrated in FIG. 2, and the control unit 130 may have any other configuration capable of performing information processing which will be described later. Further, a connection relation of the respective processing units of the control unit 130 is not limited to the connection rotation illustrated in FIG. 2, and may be any other connection relation.

2-6(1). Receiving Unit

The receiving unit 131 receives user attributes of the users using a space in which an output device is installed for each user. Specifically, the receiving unit 131 according to an embodiment receives boarding information including user attributes of passengers using an aircraft serving as a space in which the seat terminal 10 is installed for each passenger from the airline company device 20.

Further, the receiving unit 131 receives advertisement frame information serving as frame information related to a frame in which advertisement content is provided. Specifically, the receiving unit 131 according to an embodiment receives the flight ID, the departure time, the operation hours, the number of seats, the departure place, the destination, and the unit delivery price stored in the boarding information table 121b in association with the advertisement frame ID as the information related to the advertisement frame. For example, the receiving unit 131 can receive the information related to the advertisement frame from the airline company device 20 as a flight schedule is decided by an airline company. In this case, the airline company device 20 transmits the decided information related to the advertisement frame to the advertising terminal 100 together with the flight schedule.

Then, the receiving unit 131 stores the received information related to the advertisement frame in the advertisement frame table 121a of the advertisement frame storage unit 121. Further, the receiving unit 131 stores the received boarding information in the boarding information table 121b of the advertisement frame storage unit 121.

Further, there are cases in which the receiving unit 131 appropriately updates the information related to the advertisement frame and the boarding information previously stored, in the advertisement frame storage unit 121. For example, when an airline company changes a flight operation schedule, the airline company device 20 changes the information related to the advertisement frame and the boarding information. At this time, there are cases in which the receiving unit 131 acquires the changed information related to the advertisement frame and the changed boarding information from the airline company device 24, and updates the information related to the advertisement frame and the boarding information that is previously stored.

2-6(2). Providing Unit

The providing unit 132 presents the user attributes received through the receiving unit 131, and provides a selling service for a right capable of providing content in a space. Specifically, the providing unit 132 according to an embodiment presents information (that is, user attribute) such as the passengers' attributes included in the boarding information to the advertiser terminal 30 as the information related to the advertisement delivery together with the information related to the advertisement frame. Further, the providing unit 132 according to an embodiment receives information indicating that an advertisement is desired to be delivered through an advertisement frame in an aircraft serving as a space in which the seat terminal 10 is installed for each passenger from the advertiser terminal 30. As a result, the providing unit 132 according to an embodiment provides a selling service for a right capable of providing advertisement content using the seat terminal 10 to the advertiser terminal 30.

Further, the advertiser terminal 30 designates a condition related to delivery of advertisement content in the selling service. A concrete example in which the advertiser terminal 30 designates a condition related to advertisement content and uses the selling service provided by the providing unit 132 will be described below.

Here, a certain advertiser is assumed to desire to deliver the advertisement content AD01 that is an advertisement for cosmetics in an aircraft. At this time, for example, the advertiser terminal 30 can designate a delivery period of time and then designate a female as the target sex, 25 years and older as the target age, and Osaka as the destination of a target aircraft related to advertisement delivery as a condition related to the advertisement content AD01. Further, the advertiser terminal 30 can designate 100000 yen as a budget for the advertisement content AD01.

In other words, the providing unit 132 causes the advertiser terminal 30 to designate the above condition, and provides a selling service of providing the advertisement content AD01 through an advertisement frame satisfying the designated condition. As illustrated in FIG. 5, information in which the advertisement content AD01 is associated with the condition is stored in the advertisement content storage unit 122 through the storage unit 133 which will be described later. Further, determination as whether or not the condition for the advertisement content AD01 matches the advertisement frame is performed by the determining unit 134 which will be described later.

Further, the providing unit 132 can present, for example, a user interface screen through which the information related to the advertisement delivery can be designated to an advertiser. As a result, the advertising terminal 100 can present a condition that can be designated to an advertiser so that the condition can be easily understood.

2-6(3). Storage Unit

The storage unit 133 stores information related to advertisement content. Specifically, the storage unit 133 according to an embodiment stores information in which advertisement content desired to be delivered by an advertiser in the selling service provided by the providing unit 132 is associated with a condition designated together with advertisement content in the advertisement content storage unit 122.

Further, the storage unit 133 can receive advertisement content that is submitted from the advertiser terminal 30 and actually delivered through the seat terminal 10 in an aircraft, and store the advertisement content in the advertisement content storage unit 122. For example, the storage unit 133 receives, for example, data of a moving image serving as an advertisement content to be actually delivered, which is submitted from an advertiser who has decided an advertisement frame for delivering an advertisement in the selling service provided by the providing unit 132, and stores the advertisement content in the advertisement content storage unit 122.

2-6(4). Determining Unit

The determining unit 134 determines an advertisement frame suitable for delivery of advertisement content. In other words, the determining unit 134 according to an embodiment analyzes a condition designated together with advertisement content in the selling service provided by the providing unit 132 and information related to advertisement delivery received from the airline company device 20. Further, the determining unit 134 performs a process of determining a matching between advertisement content and an advertisement frame.

Next, the determination process performed by the determining unit 134 will be described in connection with a concrete example. As illustrated in FIG. 5, the advertiser identified by the advertiser ID "CL01" is assumed to desire to deliver the advertisement content AD01 serving as an advertisement for cosmetics in an aircraft. At this time, the advertiser terminal 30 identified by the advertiser ID "CL01" designates Mar. 20, 2014 through April 10 as the delivery period of time, a female as the target sex, 25 years and older as the target age, and Osaka as a destination of a target aircraft related to advertisement delivery as the condition related to the advertisement content AD01.

Here, the determining unit 134 extracts an advertisement frame satisfying a condition designated to the advertisement content AD01 with reference to the advertisement frame table 121a and the boarding information table 121b. Further, the determining unit 134 determines whether or not an advertisement frame and information related to a passenger stored in the advertisement frame table 121a and the boarding information table 121b satisfy the condition designated to the advertisement content AD01.

First, the determining unit 134 determines that the departure time and the operation hours of the flight corresponding to the advertisement frame C001 are included in the delivery period of time designated to the advertisement content AD01. Then, the determining unit 134 determines that the destination of the flight corresponding to the advertisement frame C001 is included as the target destination designated to the advertisement content AD01. Thus, the determining unit 134 determines that the advertisement content AD01 is suitable for delivery using the advertisement frame C001.

Then, the determining unit 134 extracts passengers satisfying a passenger's attribute designated to the advertisement content AD01 with reference to the boarding information table 121b. Then, the determining unit 134 calculates the number of extracted passengers. Upon receiving the result, as illustrated in FIG. 6, the determining unit 134 acquires the delivery information in which the advertisement content AD01, the advertisement frame C001, and the number of target passengers that is 80. In other words, the determining unit 134 acquires the delivery information as a matching result of advertisement content and an advertisement frame.

Then, the determining unit 134 notifies the advertiser terminal 30 identified by the advertiser ID "CL01" of the delivery information. The advertiser terminal 30 identified by the advertiser ID "CL01" transmits information indicating whether or not to accept actual delivery of advertisement content based on the delivery information to the determining unit 134.

Further, when the determining unit 134 performs the matching using the above technique, there are cases in which a plurality of advertisement frames matching the advertisement content AD01 are extracted. Further, as illustrated in FIG. 6, there are also cases in which different advertisement content AD01 and AD02 are allocated to the same advertisement frame C001.

Further, the determining unit 134 determines whether or not advertisement content to be delivered is appropriate when the delivering unit 135 which will be described later actually delivers an advertisement. In other words, the determining unit 134 determines whether or not advertisement content to be delivered to the seat terminal 10 is appropriate directly before the delivering unit 135 which will be described later delivers advertisement content to the seat terminal 10. In this case, for example, the determining unit 134 is assumed to consistently acquire information of passengers related to an aircraft being operated from the airline company device 20, and determine whether or not advertisement content is appropriate based on the acquired information.

2-6(5). Delivering Unit

The delivering unit 135 delivers content corresponding to the user to the output device for each user based on the user attribute received through the receiving unit 131. In other words, the delivering unit 135 delivers advertisement content corresponding to a passenger to the seat terminal 10 for each passenger based on the passenger's attribute included in the boarding information received through the receiving unit 131.

Specifically, the delivering unit 135 according to an embodiment delivers advertisement content to the airline company device 20. Further, the delivering unit 135 performs a process of delivering advertisement content corresponding to each passenger to the seat terminal 10 based on the delivery information stored in the delivery storage unit 123 serving as a matching result of advertisement content and an advertisement frame by the determining unit 134 through the airline company device 20.

2-6(6). Calculating Unit

The calculating unit 136 calculates a fee billed to an advertiser delivering advertisement content in the selling service provided by the providing unit 132. Specifically, the calculating unit 136 according to an embodiment calculates a fee billed to the advertiser by multiplying the number of target passengers stored in the delivery storage unit 123 by the unit delivery price stored in the advertisement frame table 121*a*.

Further, when a fee is calculated, the calculating unit 136 is assumed to receive a notification of a number corresponding to the seat terminals 10 to which advertisement content has been actually delivered from the airline company device 20. As a result, the calculating unit 136 can calculate an amount of money billed to the advertiser more accurately. Further, the calculating unit 136 notifies the advertiser terminal 30 of the calculated billing amount of money. Further, the calculating unit 136 calculates an amount of money by subtracting the calculated billing amount of money from the budget related to advertisement content stored in the advertisement content storage unit 122. Then, the calculating unit 136 causes the calculated amount of money to be stored in the advertisement content storage unit 122 as a new budget. Further, the calculating unit 136 holds delivery of advertisement content when the calculated amount of money is zero as a result of subtracting the calculated billing amount of money from the budget related to advertisement content stored in the advertisement content storage unit 122.

3. Delivery Process by Delivery System

Figure 7:
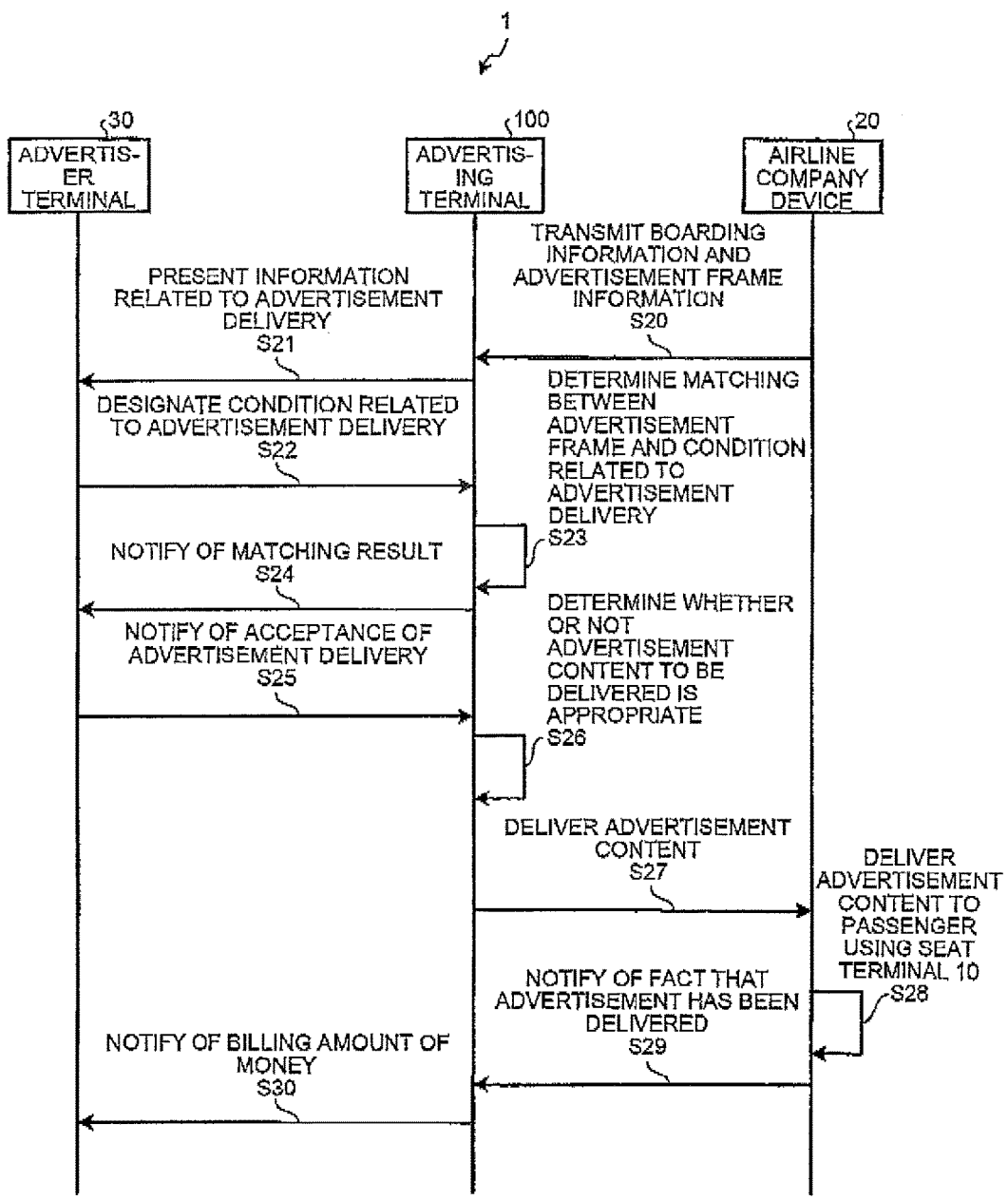
FIG. 7 is a sequence diagram illustrating a delivery process performed by a delivery system according to an embodiment.

Next, a delivery process performed by the delivery system 1 according to an embodiment will be described with reference to FIG. 7. FIG. 7 is a sequence diagram illustrating a delivery process performed by the delivery system 1.

As illustrated in FIG. 7, the airline company device 20 transmits the boarding information and the advertisement frame information to the advertising terminal 100 (step S20). The advertising terminal 100 receives and stores the boarding information and the advertisement frame information.

Then, the advertising terminal 100 presents the information related to the advertisement delivery including the boarding information and the advertisement frame information to the advertiser terminal 30 (step S21). The advertiser terminal 30 designates the condition related to the advertisement delivery of advertisement content desired to be delivered based on the information related to the advertisement delivery (step S22).

Then, the advertising terminal 100 determines matching between an advertisement frame in which advertisement content is delivered and the condition related to the advertisement delivery of advertisement content (step S23). Then, the advertising terminal 100 gives a notification to the advertiser terminal 30 based on the matching result (step S24). When advertisement content is desired to be delivered, the advertiser terminal 30 notifies the advertising terminal 100 of the fact that advertisement delivery is accepted based on the matching result (step S25).

Then, the advertising terminal 100 determines whether or not advertisement content to be actually delivered and a passenger are appropriate based on the actual boarding information or the like (step S26). When advertisement content to be delivered is appropriate, the advertising terminal 100 delivers the advertisement content to the airline company device 20 (step S27).

The airline company device 20 delivers advertisement content corresponding to a passenger to each passenger using the seat terminal 10 (step S28). Thereafter, the airline company device 20 notifies the advertising terminal 100 of the fact that advertisement content has been delivered and the number of passengers to which advertisement content has been actually delivered (step S29). Then, the advertising terminal 100 calculates an amount of money billed to the advertiser based on the number of passengers notified from the airline company device 20. Then, the advertising terminal 100 notifies the advertiser terminal 30 of the calculated billing amount of money (step S30).

4. Delivery Process by Advertising Terminal

Figure 8:
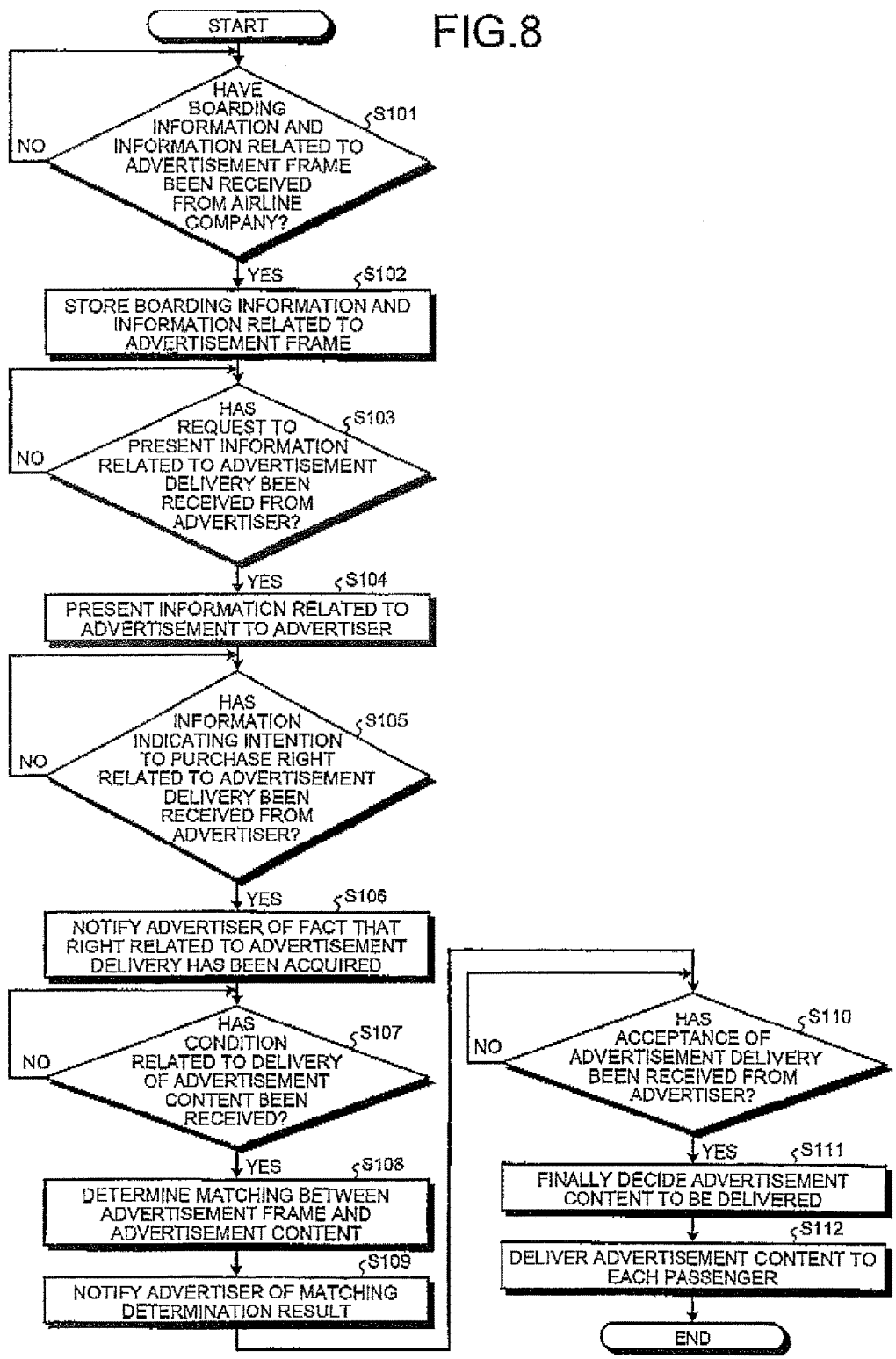
FIG. 8 is a flowchart illustrating a delivery process performed by an advertising terminal according to an embodiment.

Next, the delivery process performed by the advertising terminal 100 according to an embodiment will be described with reference to FIG. 8. FIG. 8 is a flowchart illustrating the delivery process performed by the advertising terminal 100 according to an embodiment.

As illustrated in FIG. 8, the receiving unit 131 determines whether or not the boarding information and the information related to the advertisement frame have been received from the airline company device 20 (step S101). When the boarding information and the information related to the advertisement frame have not been received (No in step S101), the receiving unit 131 is on standby until the boarding information and the information related to the advertisement frame are received.

However, when the boarding information and the information related to the advertisement frame have been received (Yes in step S101), the receiving unit 131 stores the information in the advertisement frame storage unit 121 (step S102).

Thereafter, the providing unit 132 determines whether or not a request to present the information related to the advertisement delivery has been received from the advertiser terminal 30 (step S103). Then, when the request has not been received (No in step S103), the providing unit 132 is on standby until the request is received.

However, when the providing unit 132 has received the request to present the information related to the advertisement delivery (Yes in step S103), the providing unit 132 presents the information related to the advertisement delivery to the advertiser terminal 30 (step S104).

Then, the providing unit 132 determines whether or not information indicating an intention to purchase a right related to advertisement delivery has been received from the advertiser terminal 30 (step S105). Then, when the information indicating an intention to purchase a right related to advertisement delivery has not been received (No in step S105), the providing unit 132 is on standby until the information is received.

However, when the information indicating an intention to purchase a right related to advertisement delivery has been received. (Yes in step S105), the providing unit 132 notifies the advertiser terminal 30 of the fact that the right related to the advertisement delivery has been acquired (step S106).

Thereafter, the providing unit 132 determines whether or not a condition related to delivery of advertisement content desired to be delivered has been received from the advertiser terminal 30 (step S107). Then, when the condition has not been received (No in step S107), the providing unit 132 is on standby until the condition is received.

Meanwhile, when the providing unit 132 has received the condition related to the delivery of the advertisement content (Yes in step S107), the determining unit 134 determines matching between the advertisement frame and the condition related to the delivery of the advertisement content (step S108).

Then, the determining unit 134 notifies the advertiser terminal 30 of the matching determination result (step S109). Then, the determining unit 134 determines whether or not a notification indicating that the delivery of the advertisement content is accepted based on the matching result has been received from the advertiser terminal 30 (step S110). The determining unit 134 is on standby until the notification indicating the delivery is accepted is received (No in step S110).

Meanwhile, when the determining unit 134 has received the notification indicating that the delivery of the advertisement content is accepted based on the matching result (Yes in step S110), the determining unit 134 finally decides advertisement content to delivered to each passenger in an aircraft based on the matching result (step S111).

Then, the delivering unit 135 delivers advertisement content corresponding to a passenger to each passenger in an aircraft through the airline company device 20 (step S112).

5. Modified Example

The advertising terminal 100 may be implemented in various kinds of different forms other than the above embodiment. In this regard, another embodiment of the advertising terminal 100 will be described.

5-1. Advertisement Frame Price Setting

The delivery process according to an embodiment has been described in connection with the example in which the advertising terminal 100 presents the unit delivery price as the information related to the advertisement frame, and calculates an amount of money billed to the advertiser terminal 30 based on such information. In other words, the administrator of the airline company device 20 provides an advertisement frame and earns an advertisement profit based on the unit delivery price and the number of passengers to which advertisement content is delivered. However, in this case, the administrator of the airline company device 20 hardly earns an advertisement profit unless advertisement content to be delivered is not decided although an advertisement frame is provided. In this regard, the advertising terminal 100 may receive information related to an advertisement profit separately from the unit delivery price and then provides the selling service of the advertisement frame to the advertiser terminal 30.

In other words, the receiving unit 131 receives a minimum profit desired by the airline company, which is an advertisement profit earned from the advertiser by the airline company as advertisement content is delivered. Then, the providing unit 132 presents the minimum profit received through the receiving unit 131, and provides the selling service. In this case, the advertiser purchases a right capable of delivering an advertisement in view of an amount of the presented minimum profit. Further, the providing unit 132 may cause a plurality of advertisers to present an amount of money to purchase a right capable of delivering an advertisement. In other words, the providing unit 132 presents an amount of a minimum profit, and shows the advertiser a minimum amount of money to purchase a right capable of delivering an advertisement. Further, the providing unit 132 causes a plurality of advertisers to present an amount of money to purchase a right capable of delivering an advertisement by a minimum amount of money or more. Furthermore, the providing unit 132 may sell a right capable of delivering an advertisement to an advertiser that has presented the highest purchase amount of money.

Thus, even when advertisement content to be delivered through an advertisement frame is not decided, the administrator of the airline company device 20 can reliably earn a minimum profit set to an advertisement frame. Further, the administrator of the advertising terminal 100 can be provided with a number of advertisement frames from the airline company by guaranteeing the minimum profit to the administrator of the airline company device 20. Thus, the advertising terminal 100 can increase a probability that an advertisement frame matches advertisement content by holding a number of advertisement frames, and thus it is easy to implement more targeted advertisement delivery leading to high advertising effects.

The delivery process according to the above embodiment has been described in connection with the example in which the advertising terminal 100 receives information in which an advertisement frame corresponds to a flight as information related to an advertisement frame, but a setting of an advertisement frame is not limited to this example. For example, an advertisement frame may be set in further detail each timing at which advertisement content is delivered in a flight.

5-2. Common Advertisement Content

The delivery process according to the above embodiment has been described in connection with the example in which the advertising terminal 100 delivers advertisement content corresponding to a passenger to each passenger. However, the advertising terminal 100 may deliver advertisement content common to passengers in an aircraft. This point will be described below.

For example, the delivering unit 135 delivers common content to the seat terminal 10 based on a tendency in user attributes of passengers using an aircraft. For example, when there is a tendency that among passengers of an aircraft related to a certain advertisement frame, passengers of "male" and "20s" are in a majority as an advertisement delivery target, the delivering unit 135 delivers common advertisement content targeted on "male" and "20s" to all the seat terminals 10. As described above, even when common advertisement content is delivered in an aircraft, the advertising terminal 100 can deliver advertisement content considered to have a high effect based on a tendency of passengers' attributes.

Further, the delivering unit 135 can deliver advertisement content associated with a destination of an aircraft as common advertisement content. For example, the delivering unit 135 delivers advertisement content advertising transportation-related companies operating, for example, buses or taxis that are on standby at a destination of an aircraft as common advertisement content. Further, the advertisement content may be configured to receive an input from the seat terminal 10. For example, when delivery of the advertisement content is received in an aircraft, a passenger can book a bus or a taxi by performing an input operation using the seat terminal 10.

Further, the advertisement content may be configured to advertise a service that is added when a certain number of inputs are received from the seat terminals 10. For example, in the case of advertisement content related to transportation-related companies operating, for example, buses or taxis that are on standby at a destination of an aircraft, the delivering unit 135 delivers advertisement content advertising content in which service fees of buses or taxis that are on standby are discounted when a certain number of reservations are received from an aircraft. Further, when delivery of the advertisement content is received in an aircraft, a passenger inputs a certain response using the seat terminal 10. The delivering unit 135 acquires the input information through the airline company device 20. Then, the delivering unit 135 notifies the advertiser terminal 30 of the fact that a certain number of reservations have been received from an aircraft.

As described above, the advertising terminal 100 delivers advertisement content associated with a destination of an aircraft as common advertisement content. Thus, the advertising terminal 100 can have high advertising effects on advertisement delivery in an aircraft serving as a space in which an output device is installed for each user. Further, the advertiser can provide the passengers with useful information by delivering advertisement content associated with a business operation at the destination.

5-3. Delivery Determination

The delivery process according to the above embodiment has been described in connection with the example in which the advertising terminal 100 determines matching between an advertisement frame and advertisement content, and delivers advertisement content suitable for an advertisement frame to the airline company device 20. In other words, the advertising terminal 100 delivers advertisement content to the seat terminal 10 of each passenger though the airline company device 20. Further, the advertising terminal 100 can adjust a timing at which advertisement content is delivered according to an actual passenger situation in an aircraft. This point will be described below.

For example, the determining unit 134 determines whether or not it is a state in which a passenger can check advertisement content delivered through the seat terminal 10. Then, the delivering unit 135 delivers advertisement content to the seat terminal 10 used by a passenger determined to be in the checkable (seeable) state through the determining unit 134.

In other words, the determining unit 134 consistently acquires information of passengers related to an aircraft being operated from the airline company device 20, and determines whether or not it is a state in which a passenger can check advertisement content based on this information. Here, "a state in which a passenger can check advertisement content" refers to a state in which a passenger is likely to view advertisement content delivered from the seat terminal 10 or a state in which a passenger can check content of advertisement content.

As a concrete example, when a seat belt of a seat allocated to each passenger is buckled up, the determining unit 134 determines that it is a state in which the passenger can check advertisement content. In this case, the determining unit 134 is assumed to acquire information of a sensor indicating that a seat belt is buckled up as information of passengers related to an aircraft being operated from the airline company device 20. Then, the delivering unit 135 delivers advertisement content to only the seat terminal 10 used by the passengers determined to be in the checkable state through the determining unit 134. Further, the delivering unit 135 is on standby for delivery of advertisement content for the passengers determined to be not in the checkable state through the determining unit 134. Further, information used to determine whether or not it is a state in which the passenger can check advertisement content is not limited to information related to a seat belt. For example, when a device (for example, a camera or the like) capable of monitoring motion of passengers in the seat terminal 10 or an aircraft, the determining unit 134 may determine whether or not it is a state in which a passenger can check advertisement content based on information acquired from this device. In other words, the determining unit 134 may determine whether or not it is a state in which a passenger is sitting on a seat and deliver advertisement content to the seat terminal 10 used by the passenger determined to be sitting.

As described above, the advertising terminal 100 delivers advertisement content at an appropriate timing based on actual boarding information. Thus, the advertising terminal 100 can cause the passengers to reliably view advertisement content submitted from the advertiser and thus implement delivery leading to high advertising effects for the advertiser.

5-4. Restricted Content

The delivery process according to the above embodiment has been described in connection with the example in which the advertising terminal 100 determines matching of an advertisement frame and advertisement content, and delivers advertisement content suitable for an advertisement frame to the airline company device 20. In other words, the advertising terminal 100 delivers advertisement content to the seat terminal 10 of each passenger through the airline company device 20. However, in this case, the advertising terminal 100 delivers advertisement content based on the boarding information and the information related to the advertisement frame before an aircraft is operated, and thus it is not necessarily clear whether or not advertisement content is appropriate to actual passengers. In this regard, the advertising terminal 100 may determine whether or not advertisement content is appropriate before advertisement content is delivered to the seat terminal 10. This point will be described with reference to FIG. 9.

Figure 9:
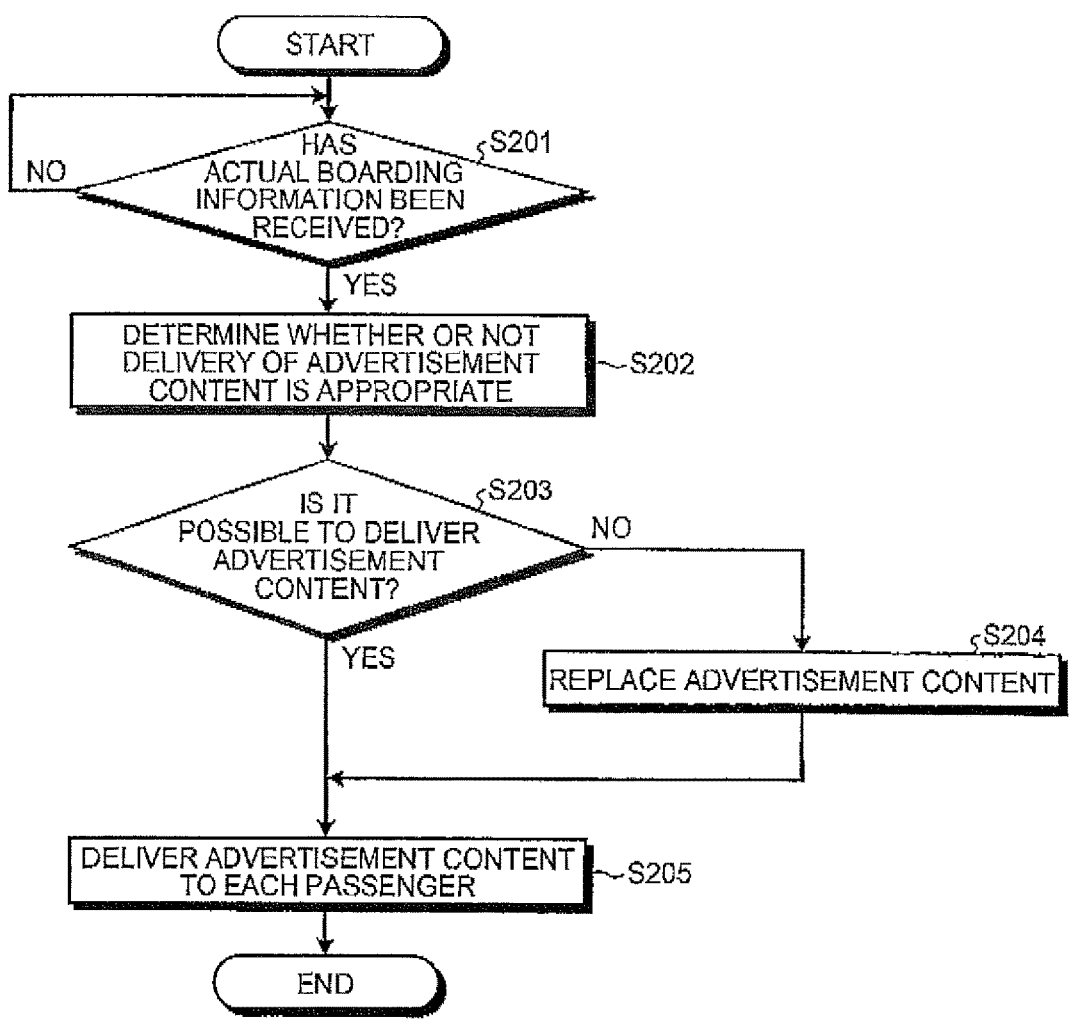
FIG. 9 is a flowchart illustrating a delivery process performed by an advertising terminal according to a modified example.

FIG. 9 is a flowchart illustrating a delivery process performed by the advertising terminal 100 according to a modified example. In the example illustrated in FIG. 9, the advertising terminal 100 determines matching between an advertisement frame and advertisement content, and delivers advertisement content to the airline company device 20.

As illustrated in FIG. 9, the determining unit 134 determines whether or not actual boarding information for an aircraft has been received from the airline company device 20 before advertisement content is actually delivered in an aircraft (step S201). Then, when the actual boarding information for an aircraft has not been received (No in step S201), the determining unit 134 is on standby until the actual boarding information is received.

However, when the boarding information has been received (Yes in step S201), the determining unit 134 determines whether or not advertisement content to be delivered is appropriate to the seat terminal 10 serving as the delivery target based on the actual boarding information (step S202).

Then, the determining unit 134 determines whether or not it is possible to deliver the advertisement content (step S203). When it is determined that it is difficult to deliver the advertisement content (No in step S203), the determining unit 134 replaces the advertisement content with appropriate advertisement content (step S204).

However, when the determining unit 134 determines that it is possible to deliver the advertisement content (Yes in step S203) or when the determining unit 134 replaces the advertisement content with appropriate advertisement content (step S204), the delivering unit 135 delivers to the advertisement content to each passenger (step S205). Then, the advertisement delivery process performed by the advertising terminal 100 based on the actual boarding information is completed.

As described above, the advertising terminal 100 can deliver advertisement content based on actual boarding information. Thus, the advertising terminal 100 can deliver advertisement content to a truly appropriate target.

For example, the delivering unit 135 can deliver content other than restricted content that is restricted from being delivered to a passenger having a certain user attribute to the seat terminal 10 of the corresponding passenger. Specifically, the delivering unit 135 can prevent advertisement content (for example, alcohol- or cigarette-related content) restricted from being delivered to minors from being delivered to the seat terminal 10 used by a passenger of a minor. In this case, the delivering unit 135 replaces restricted content with content (for example, advertisement content of an airline company prepared in advance) other than restricted content, and delivers the replaced content.

As another example, the determining unit 134 may determine whether or not advertisement content on which a payment operation can be performed is content restricted for a passenger based on an age of a passenger serving as a user attribute. Specifically, the determining unit 134 determines whether or not it is appropriate to deliver advertisement content considered to be associated with a payment operation such as advertisement content in which a reservation of a bus or a taxi is received or advertisement content in which it is possible to order a product at that place. In other words, when the advertisement content can be delivered to minors, the determining unit 134 can regard the advertisement content as restricted content. In this case, the delivering unit 135 can replace the restricted content with content other than the restricted content and then deliver the replaced content. Alternatively, the delivering unit 135 may determine that a payment operation input from the seat terminal 10 used by the passenger of the minor is invalid.

As described above, the advertising terminal 100 delivers advertisement content to a truly appropriate target based on actual boarding information. Thus, the advertising terminal 100 can cause an appropriate passenger to view advertisement content submitted from the advertiser and thus implement accurately targeted delivery leading to high advertising effects. Further, the advertiser can deliver an advertisement without being concerned about fine advertisement content replacement according to a passenger and thus easily deliver an advertisement.

5-5. Space Form

The above embodiment has been described in connection with the example in which an aircraft inside serves as a space in which an output device is installed for each user. In other words, the delivery process according to an embodiment has been described in connection with the example in which the advertising terminal 100 delivers advertisement content to the seat terminal 10 equipped in an aircraft. However, a space in which an output device is installed for each user is not limited to an aircraft inside. For example, as a moving object forming a space in which an output device is installed for each user, there is a bus or a ferry in which an output device is equipped in each seat. Further, an object forming a space in which an output device is installed for each user is not limited to a moving object. For example, the object may be a facility in which an output device is equipped in each seat.

Further, the above embodiment has been described in connection with the example in which the advertising terminal 100 receives user attributes of passengers from the boarding information of the airline company device 20. However, a device that receives user attributes of the users in a space in which an output device is installed for each user is not limited to the above example.

For example, the advertising terminal 100 may receive user attributes of the users using a user information acquiring device that acquires information of the users using a space in which an output device is installed for each user. For example, the user information acquiring device corresponds to at least device such as a camera or an access point. When a camera is included as the user information acquiring device, for example, the camera is installed at a position at which it is possible to photograph a facial image of the user sitting on an output device installed in the space, photographs and acquires a facial image of each user, and acquires the user's attribute from the acquired facial image of the user. As a result, the advertising terminal 100 can obtain the user attribute from the photographed image.

Further, when an access point is included as the user information acquiring device, the access point performs communication with a mobile terminal held by each User through wireless communication such as wireless fidelity (Wi-Fi) (a registered trademark). Further, the access point acquires a user ID transmitted from a mobile terminal held by each user, and acquires individual information associated with the acquired user ID as the user's attribute. Thus, the advertising terminal 100 can obtain the user attribute from the mobile terminal communicating with the user information acquiring device. In the case of this example, a certain server device accessible by the advertising terminal 100 is assumed to store the user's attribute information in association with the user ID. Further, when a retina scanner device is included as the user information acquiring device, the retina scanner device is installed at a position of an output device usable by each user, and acquires a result of scanning the user's retina as the user's attribute. Using the above-described technique, the advertising terminal 100 can receive the user attribute of the user using the space.

5-6. Advertisement Frame Setting

The above embodiment has been described in connection with the example in which a one advertisement frame is set to each flight, and an advertiser acquires an advertisement frame for each flight. However, a plurality of advertisement frames may be set to each flight. Further, when a plurality of advertisement frames are set to each flight, the advertising terminal 100 may provide the advertiser with a selling service related to a plurality of advertisement frames.

For example, the airline company device 20 may set an advertisement frame based on the number of deliveries of advertisement content to be provided for single flight and the number of seats. As a concrete example, for a flight in which advertisement content is delivered five times for single flight and the number of seats is 300, the airline company device 20 provides the advertising terminal 100 with 1500 advertisement frames obtained by multiplying the number of deliveries of advertisement content by the number of seats. In this case, a one advertisement frame indicates a frame used to deliver advertisement content to a one passenger once.

Then, the advertising terminal 100 can divide 1500 advertisement frames and sells them to the advertisers. Thus, the advertiser can purchase, for example, 300 advertisement frames without acquiring all advertisement frames related to a one flight. Thus, the advertising terminal 100 can provide a selling service in which the advertiser has a burden smaller than when the advertiser acquires all advertisement frames related to a one flight.

Further, the advertising terminal 100 may deliver advertisement content across aircrafts without being to a single aircraft in the above advertisement frame. In other words, when a condition presented by the advertiser is not appropriate to passengers of a certain aircraft, and advertisement content has been delivered by only 300 frames in the aircraft, the advertising terminal 100 may deliver advertisement content in any other aircraft. In other words, the advertising terminal 100 can deliver the advertisement content across aircrafts until the number of impressions (what one passenger views advertisement content once) corresponding to 300 frames is reached. As described above, the advertising terminal 100 can sell an advertisement frame in a small unit and thus can provide the advertisement delivery service useful for the advertiser.

5-7. Information Related to Advertisement Frame

The above Embodiment has been described in connection with the example in which the advertising terminal 100 acquires information such as a departure time, operation hours, the number of seats, a departure place, and a destination of a flight, and a unit delivery price as the information related to the advertisement frame. However, the advertising terminal 100 may acquire different information as the information related to the advertisement frame.

For example, the advertising terminal 100 acquires identification information identifying an airline company or information related to a class of service set to each user of the seat terminal 10 in an aircraft as the information related to the advertisement frame. Here, a class of service set to each user of the seat terminal 10 indicates a class of service of each seat such as an economy class, a business class, and a first class typically set to a passenger aircraft. Hereinafter, a class of service set to each user of the seat terminal 10 is also denoted as a seat class.

The advertising terminal 100 acquires identification information identifying an airline company and information related to a seat class of each passenger. Thus, the advertising terminal 100 can provide the advertiser with an advertisement frame selling service in which a condition can be set in further detail. For example, the advertising terminal 100 can receive advertisement content submitted from an advertiser who desires to provide advertisement content for passengers who have purchased a first class regardless of an airline company.

Further, the above embodiment has been described in connection with the example in which the advertising terminal 100 acquires a unit delivery price per passenger as the information related to the advertisement frame. However, as described above, an advertisement frame may be sold in units of frames of each number of impressions or may be sold as an advertisement frame to which a seat class is set. In other words, the advertising terminal 100 can flexibly set a delivery fee of advertisement content related to an advertisement frame.

For example, the advertising terminal 100 can provide the advertisement frame selling service such that advertisement content is delivered until the number of impressions reaches a certain value. In this case, the advertising terminal 100 can guarantee the number of impressions and thus deliver to the passenger by the number of deliveries desired by the advertiser regardless of an aircraft or an airline company.

Further, for example, the advertising terminal 100 can provide the selling service as a package in which a certain delivery purpose is set to an advertisement frame regardless of an aircraft or an airline company. In this case, the advertising terminal 100 sells a package to the advertiser who performs a business operation at a certain destination in connection with an advertisement frame to which the destination is set. In other words, the advertising terminal 100 can sell advertisement frames of a one week related to an aircraft directed to a certain destination collectively as a package.

Further, the advertising terminal 100 may combine various kinds of information related to an advertisement frame with a sales system in connection with the sale of an advertisement frame. Specifically, the advertising terminal 100 may set the number of impressions in connection with advertisement frames sold as a package. Further, the advertising terminal 100 may provide a package sale for each seat class instead of a destination.

As described above, the advertising terminal 100 can provide a service related to advertisement delivery to the seat terminal 10 in an aircraft in various forms regardless of an aircraft or an airline company. In other words, the advertising terminal 100 can increase an advertiser's convenience in connection with a procedure related to advertisement delivery by managing a service related to advertisement delivery to the seat terminal 10 in an aircraft in an integrated fashion and implement advertisement delivery according to an advertiser's budget. Further, the advertising terminal 100 can deliver advertisement content under a detailed condition setting and thus increase advertising effects.

6. Others

Among the processes described in the above embodiments, all or some processes described to be performed automatically may be performed manually, or all or some processes described to be performed manually may be performed automatically by a known method. Further, a processing process, a concrete name, or information including various kinds of data or parameters described in this document or the drawings can be arbitrarily changed unless specifically mentioned above. For example, various kinds of information illustrated in the drawings are not limited to illustrated information.

Further, the respective components of the respective devices illustrated in the drawings are functionally conceptual ones, and need not necessarily be physically configured as illustrated in the drawings. In other words, a concrete form of distribution or integration of the respective devices is not limited to the illustrated one, and some or all thereof may be configured to be distributed or integrated in arbitrarily units functionally or physically according to various kinds of loads or use statuses.

For example, the above embodiments have been described in connection with the example in which the delivery system 1 includes the seat terminal 10, the airline company device 20, the advertiser terminal 30, and the advertising terminal 100 as illustrated in FIG. 1, but the delivery system 1 is considered to be configured in another form. For example, the delivery system 1 may include an advertisement bidding management server that controls a plurality of advertiser terminals 30 in general. In this case, the advertising terminal 100 provides the information related to the advertisement frame and the advertisement frame selling service to the advertisement bidding management server.

Further, for example, the advertising terminal 100 illustrated in FIG. 2 may be distributed into a providing device that receives the information related to the advertisement frame and provides the selling service and a delivery device that delivers advertisement content. In this case, the providing device may not include the delivering unit 135 illustrated in FIG. 2. Further, the delivery device may not include the receiving unit 131 and the providing unit 132 illustrated in FIG. 2.

Further, for example, the advertisement frame storage unit 121, the advertisement content storage unit 122, or the delivery storage unit 123 illustrated in FIG. 2 may be held in a storage server (not illustrated) or the like instead of the advertising terminal 100. In this case, the advertising terminal 100 acquires various kinds of information stored in the advertisement frame storage unit 121, the advertisement content storage unit 122, or the delivery storage unit 123.

Further, for example, the advertising terminal 100 may deliver advertisement content directly to the seat terminal 10 without intervention of the airline company device 20. In this case, the seat terminal 10 is assumed to include a device that implements a communication function corresponding to the communication unit 110. Furthermore, the seat terminal 10 is provided with advertisement content from the advertising terminal 100 via a network N. In addition, the seat terminal 10 may transmit a request to the advertising terminal 100 through an input device.

Further, the above embodiments can be appropriately combined within the scope in which processing content is not contradictory.

7. Hardware Configuration

Figure 10:
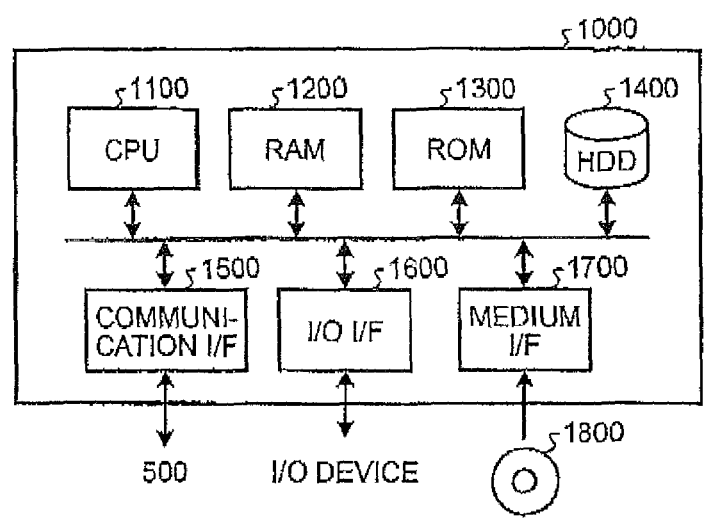
FIG. 10 is a hardware configuration diagram illustrating an exemplary computer that implements a function of an advertising terminal.

The advertising terminal 100 according to an embodiment is implemented, for example, by a computer 1000 having a configuration illustrated in FIG. 10. The following description will proceed in connection with an example of the advertising terminal 100. FIG. 10 is a hardware configuration diagram illustrating an example of the computer 1000 that implements the function of the advertising terminal 100. The computer 1000 includes a CPU 1100, a RAM 1200, a ROM 1300, a HDD 1400, a communication interface (I/F) 1500, an input/output (I/O) I/F 1600, and a medium I/F 1700.

The CPU 1100 operates based on a program stored in the ROM 1300 or the HOD 1400, and controls the respective components. The ROM 1300 stores a boot program executed by the CPU 1100 when the computer 1000 is activated, a program depending on hardware of the computer 1000, and the like.

The HDD 1400 stores a program executed by the CPU 1100, data used by the program, and the like. The communication I/F 1500 receives data from another device via a communication network 500, transfers the received data to the CPU 1100, and transmits data generated by the CPU 1100 to another device via the communication network 500.

The CPU 1100 control an output device such as a display or a printer and an input device such as a keyboard or a mouse through the I/O I/F 1600. The CPU 1100 acquires data from the input device through the I/O I/F 1600. Further, the CPU 1100 outputs generated data to the output device through the I/O I/F 1600.

The medium I/F 1700 reads out a program or data stored in a recording medium 1800, and provides the read program or data to the CPU 1100 through the RAM 1200. The CPU 1100 loads the program from the recording medium 1800 onto the RAM 1200 through the medium I/F 1700, and executes the loaded program. Examples of the recording medium 1800 include an optical recording medium such as a digital versatile disc (DVD) or a phase change rewritable disk (PD), a magneto optical recording medium such as a magneto-optical disk (MO), a tape medium, a magnetic recording medium, and a semiconductor memory.

For example, when the computer 1000 functions as the advertising terminal 100 according to an embodiment, the CPU 1100 of the computer 1000 executes the program loaded onto the RAM 1200 and implements the function of the control unit 130. Further, the HDD 1400 stores data in the advertisement frame storage unit 121, the advertisement content storage unit 122, and the delivery storage unit 123. The CPU 1100 of the computer 1000 reads the program from the recording medium 1800 and executes the program, but the program may be acquired from another device through the communication network 500.

8. Effects

As described above, the advertising terminal 100 according to an embodiment includes the receiving unit 131 that receives the user attribute of the passenger using an aircraft in which the seat terminal 10 is installed for each passenger and the delivering unit 135 that delivers advertisement content (an example of content) corresponding to a passenger to the seat terminal 10 based on the user attribute received through the receiving unit 131.

Thus, the advertising terminal 100 according to an embodiment can deliver advertisement content suitable for each user in advertisement delivery in an aircraft serving as a space in which an output device is installed for each user, and thus can implement advertisement delivery targeted on an advertising target, leading to high advertising effects. Accordingly, the advertising terminal 100 can effectively use the seat terminal 10 equipped in the aircraft.

Further, the advertising terminal 100 according to an embodiment further includes the providing unit 132 that presents the user attribute received through the receiving unit 131, and provides the selling service for a right capable of providing advertisement content in an aircraft.

Thus, the advertising terminal 100 according to an embodiment causes the advertiser to avoid a complicated task of appropriately acquiring bidding information related to an advertisement in an aircraft and submitting advertisement content to each aircraft. In other words, the advertising terminal 100 according to an embodiment simplifies the advertiser's work related to the advertisement delivery and reduces the advertiser's burden.

Further, the receiving unit 131 receives frame information related to a frame in which advertisement content is provided, and the providing unit 132 presents the frame information together with the user attribute, and provides the selling service.

Thus, the advertising terminal 200 according to an embodiment can implement advertisement delivery accurately targeted on en advertising target, leading to high advertising effects, in advertisement delivery in an aircraft.

Further, the receiving unit 131 receives at least one of the number of output devices in a space, a date and time at which the content is provided, and compensation from a provider according to provision of the content as the frame information.

Thus, the advertising terminal 100 according to an embodiment can receive a advertiser's detailed desire in advertisement delivery in an aircraft. Accordingly, the advertising terminal 100 according to an embodiment can accurately extract a passenger serving as an advertisement delivery target according to a request received from an advertiser. In other words, the advertising terminal 100 according to an embodiment can perform advertisement delivery having high effects by delivering an advertisement to a passenger matching an advertiser's request. Further, the advertising terminal 100 according to an embodiment delivers only to the extracted passenger and thus prevents advertisement delivery considered to have low effects. Thus, there is an advantage that an advertiser who performs advertisement delivery such that billing is performed according to the number of deliveries can reduce a budget.

Further, the receiving unit 131 receives at least one of identification information of an aircraft serving as a moving object in which a space is formed, a class of service set to each passenger of an aircraft, a moving start date and time of an aircraft, a period of time required for movement of an aircraft, a departure place of an aircraft, and a destination of an aircraft as the frame information.

Through the above information, the advertising terminal 100 according to an embodiment can receive the advertiser's detailed desire in advertisement delivery in an aircraft. Accordingly, the advertising terminal 100 according to an embodiment can accurately extract a passenger serving as an advertisement delivery target according to a request received from an advertiser.

Further, the receiving unit 131 receives a minimum profit desired by an administrator managing an aircraft as a profit earned from an advertiser of advertisement content by an administrator managing an aircraft by delivering advertisement content. The providing unit 132 presents the minimum profit received through the receiving unit 131, and provides the selling service.

Thus, the advertising terminal 100 according to an embodiment can cause the administrator of the airline company device 20 to earn an advertisement profit reliably even when an advertisement content to be delivered through an advertisement frame is not decided yet in advertisement delivery in an aircraft. For this reason, the advertising terminal 100 according to an embodiment can be provided with a number of advertisement frames from an airline company side. As a result, the advertising terminal 100 can increase a probability that an advertisement frame will match advertisement content by holding a number of advertisement frames, and thus it is easy to implement advertisement delivery leading to high advertising effects.

Further, the delivering unit 135 delivers common advertisement content to the seat terminal 10 of each passenger based on a tendency in user attributes of passengers using an aircraft.

Thus, the advertising terminal 100 according to an embodiment can deliver advertisement content targeted on a class of customers considered to be high in advertising effect even when common advertisement content is delivered in advertisement delivery in an aircraft.

Further, the delivering unit 135 delivers advertisement content related to a destination of an aircraft as common advertisement content.

Thus, the advertising terminal 100 according to an embodiment can commonly deliver advertisement content related to a destination of an aircraft to all passengers. For this reason, the advertising terminal 100 according to an embodiment can implement high advertising effects in conjunction with a business operation of an advertiser at a destination in advertisement delivery in an aircraft.

Further, the advertising terminal 100 according to an embodiment further includes the determining unit 134 that determines whether or not it is in a state in which a passenger can check advertisement content delivered from the seat terminal 10. The delivering unit 135 delivers advertisement content to the seat terminal 10 of the passenger determined to be in the checkable state by the determining unit 134. Specifically, when a seat belt of a seat allocated to each passenger is buckled up, the determining unit 134 determines the passenger to be in the state in which advertisement content is checkable.

Thus, the advertising terminal 100 according to an embodiment delivers advertisement content at an appropriate timing based on actual boarding information. For this reason, the advertising terminal 100 according to an embodiment can cause the passenger to reliably view advertisement content submitted from the advertiser and thus perform delivery giving high advertising effects to the advertiser.

Further, the delivering unit 135 delivers content other than restricted content restricted from being delivered to a passenger having a certain user attribute to the seat terminal 10 of the passenger.

Thus, the advertising terminal 100 according to an embodiment can deliver advertisement content to a truly appropriate target based on actual boarding information. In other words, the advertising terminal 100 according to an embodiment can cause an appropriate passenger to view advertisement content submitted from the advertiser and thus implement accurately targeted deliver leading to high advertising effects.

Further, the determining unit 134 determines whether or not content in which a payment operation can be performed corresponds to restricted content for a passenger based on an age of a passenger serving as a user attribute.

Thus, the advertising terminal 100 according to an embodiment can deliver advertisement content to a truly appropriate target based on actual boarding information. For this reason, the advertising terminal 100 according to an embodiment can perform the advertisement delivery process without causing the advertiser to be concerned about fine replacement of advertisement content according to a passenger. In other words, using the advertising terminal 100 according to an embodiment, the advertiser can easily perform the procedure of delivering an advertisement to an aircraft.

The embodiment of the present disclosure have been described above in detail with reference to the appended drawings, but the above embodiments are examples, and the present invention can be implemented in different forms in which various modifications or improvements are made from the aspects described in the disclosure of the invention based on knowledge of a person skilled in the art.

Further, "section, module, or unit" described above can be interpreted as "means," "circuit," or the like. For example, the providing unit can be interpreted as a providing means or a providing circuit.

According to an aspect of an embodiment, there is an effect of effectively using an output device installed for each user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An advertisement delivery device, comprising:
a network interface configured to communicate with an advertiser terminal and a server;
a memory; and
a processor programmed to:
receive from the server and store in the memory advertisement frame information including (i) a user attribute of each of a plurality of users boarding a moving object in which an output device is installed for each user, (ii) destination information of the moving object, and (iii) information related to a seat class set to each user, the user attribute including at least one of sex and age of the user;
receive an advertisement delivery instruction and advertisement content from the advertiser terminal, the advertisement delivery instruction including at least one of a target sex and a target age range;
determine matching between the advertisement frame information and the advertisement delivery instruction;
determine whether a majority of the plurality of the users have a same user attribute;
upon a determination that a majority of the plurality of the users do not have a same user attribute, deliver the advertisement content to the output device for each user in the identified group based on the determined matching; and
upon a determination that a majority of the plurality of the users have a same user attribute:
identify common advertisement content that is based on the same user attribute; and
deliver the identified common advertisement content to the output devices of the users.

2. The delivery device according to claim 1, wherein the processor is programmed to:
output the received user attribute and a request for offers from providers to provide the advertisement content.

3. The delivery device according to claim 2, wherein the processor is programmed to:
receive frame information related to a frame in which the advertisement content is provided; and
present the frame information together with the user attribute.

4. The delivery device according to claim 3, wherein the processor is programmed to:
receive at least one of the number of output devices in the moving object, a date and time at which the advertisement content is provided, and a profit earned from a provider by providing the advertisement content as the frame information.

5. The delivery device according to claim 3, wherein the processor is programmed to:
receive at least one of identification information of the moving object, a moving start date and time of the moving object, a period of time required for movement of the moving object, a departure place of the moving object, and a destination of the moving object as the advertisement frame information.

6. The delivery device according to claim 2, wherein the processor is programmed to:

receive a minimum profit desired by an administrator managing the moving object as a profit earned from a provider of the advertisement content by the administrator as the advertisement content is delivered; and
present the received minimum profit.

7. The delivery device according to claim 1, wherein the processor is programmed to:
deliver advertisement content associated with a destination of the moving object as the common advertisement content.

8. The delivery device according to claim 1, wherein the processor is programmed to:
determine whether or not each user is in a state in which content output from the output device is seeable by the user; and
for each user, deliver the advertisement content to the output device of the user when the user is determined to be in the state in which the content is seeable.

9. The delivery device according to claim 8, wherein the processor is programmed to:
for each user, determine that the user is in the state in which the content is seeable when a seat belt of a seat allocated to the user is fastened.

10. The delivery device according to claim 1, wherein the processor is programmed to:
deliver advertisement content other than restricted content restricted from being delivered to a user having a certain user attribute to the output device of the user having the certain user attribute.

11. The delivery device according to claim 10, wherein the certain user attribute is user age; and
the processor is programmed to
determine whether or not content in which a payment operation is allowed corresponds to the restricted content based on an age of the user having the certain user attribute.

12. A processing method executed by a computer, comprising:
receiving from a server and storing in a memory advertisement frame information including (i) a user attribute of each of a plurality of users boarding a moving object in which an output device is installed for each user, (ii) destination information of the moving object, and (iii) information related to a seat class set to each user, the user attribute including at least one of sex and age of the user;
receiving an advertisement delivery instruction and advertisement content from the advertiser terminal, the advertisement delivery instruction including at least one of a target sex and a target age range;
determining matching between the advertisement frame information and the advertisement delivery instruction;
determining whether a majority of the plurality of the users have a same user attribute;
upon a determination that a majority of the plurality of the users do not have a same user attribute, delivering the advertisement content to the output device for each user in the identified group based on the determined matching; and
upon a determination that a majority of the plurality of the users have a same user attribute:
identifying common advertisement content that is based on the same user attribute: and
delivering the identified common advertisement content to the output devices of the users.

13. A non-transitory computer readable storage medium containing program instructions for a delivery program, the instructions executable by one or more processors of a computer to perform:
- receiving from a server and store in a memory advertisement frame information including (i) a user attribute of each of a plurality of users boarding a moving object in which an output device is installed for each user, (ii) destination information of the moving object, and (iii) information related to a seat class set to each user, the user attribute including at least one of sex and age of the user;
- receiving an advertisement delivery instruction and advertisement content from the advertiser terminal, the advertisement delivery instruction including at least one of a target sex and a target age range;
- determining matching between the advertisement frame information and the advertisement delivery instruction;
- determining whether a majority of the plurality of the users have a same user attribute;
- upon a determination that a majority of the plurality of the users do not have a same user attribute, delivering the advertisement content to the output device for each user in the identified group based on the determined matching; and
- upon a determination that a majority of the plurality of the users have a same user attribute:
  - identifying common advertisement content that is based on the same user attribute; and
  - delivering the identified common advertisement content to the output devices of the users.

* * * * *